United States Patent
Cao et al.

(10) Patent No.: US 9,812,077 B2
(45) Date of Patent: Nov. 7, 2017

(54) DISPLAY PANEL OF TOUCH SCREEN AND ELECTRONIC DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Zhaokeng Cao, Shanghai (CN); Gang Liu, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 15/497,085

(22) Filed: Apr. 25, 2017

(65) Prior Publication Data
US 2017/0227823 A1    Aug. 10, 2017

Related U.S. Application Data

(63) Continuation-in-part of application No. 14/819,208, filed on Aug. 5, 2015, now Pat. No. 9,666,146.

(30) Foreign Application Priority Data

Apr. 1, 2015    (CN) .......................... 2015 1 0152688

(51) Int. Cl.
*G06F 3/044*    (2006.01)
*G09G 3/36*    (2006.01)
*G02F 1/13*    (2006.01)

(52) U.S. Cl.
CPC ............... *G09G 3/36* (2013.01); *G06F 3/044* (2013.01); *G02F 1/13* (2013.01)

(58) Field of Classification Search
CPC combination set(s) only.
See application file for complete search history.

(56) References Cited

U.S. PATENT DOCUMENTS 6,570,554 B1 *    5/2003    Makino ................. G09G 3/3413
                                                              345/102
8,503,063 B2 *    8/2013    Sprague .................. G02F 1/167
                                                              345/107

(Continued)

*Primary Examiner* — Van Chow
(74) *Attorney, Agent, or Firm* — Alston & Bird LLP

(57) ABSTRACT

A display panel of touch screen is provided. The display panel includes: a color filter substrate and an array substrate; the color filter substrate includes a black matrix; the array substrate includes pixel units and touch control units; the pixel units includes first pixel units and second pixel units, each first pixel unit includes first sub-pixel for displaying first color, second sub-pixel for displaying second color, third sub-pixel for displaying third color and fourth sub-pixel for displaying fourth color, each second pixel units includes fifth sub-pixel for displaying third color, sixth sub-pixel for displaying fourth color, seventh sub-pixel for displaying first color and eighth sub-pixel for displaying second color, the fourth sub-pixel and the sixth sub-pixel each is a white sub-pixel; the white sub-pixel includes first region and second region, the second region is sheltered by the black matrix from the light emitting direction of the display panel.

20 Claims, 9 Drawing Sheets

(56) References Cited

U.S. PATENT DOCUMENTS

| | | | | |
|---|---|---|---|---|
| 8,780,133 B2* | 7/2014 | Jeong | .................. | G09G 5/02 345/590 |
| 2004/0095521 A1* | 5/2004 | Song | .................. | G02F 1/133514 349/61 |
| 2007/0080912 A1* | 4/2007 | Asao | .................. | G02F 1/13363 345/87 |
| 2008/0036951 A1* | 2/2008 | Tsai | .................. | G02F 1/13338 349/110 |
| 2009/0225015 A1* | 9/2009 | Itoh | .................. | G02F 1/136286 345/84 |
| 2009/0273607 A1* | 11/2009 | Ueki | .................. | G09G 3/2003 345/590 |
| 2010/0165005 A1* | 7/2010 | Sprague | .................. | G02F 1/167 345/690 |
| 2014/0125880 A1* | 5/2014 | Tsai | .................. | G06F 3/0412 349/12 |
| 2016/0012784 A1* | 1/2016 | Xu | .................. | G09G 3/3607 345/88 |
| 2016/0026038 A1* | 1/2016 | Xu | .................. | G02F 1/133514 345/690 |
| 2016/0026311 A1* | 1/2016 | Wang | .................. | G06F 3/044 345/173 |
| 2016/0027841 A1* | 1/2016 | Xu | .................. | H01L 27/124 257/89 |
| 2016/0259449 A1* | 9/2016 | Mizuhashi | .................. | G06F 3/044 |

* cited by examiner

# DISPLAY PANEL OF TOUCH SCREEN AND ELECTRONIC DEVICE

CROSS-REFERENCE TO RELATED APPLICATIONS

The present application is a continuation-in-part of U.S. patent application Ser. No. 14/819,208, filed on Aug. 5, 2015, which claims priority to Chinese patent application No. CN201510152688.X, filed on Apr. 1, 2015, and entitled "DISPLAY PANEL OF TOUCH SCREEN AND ELECTRONIC DEVICE". The entire disclosures of the above applications are incorporated herein by reference.

TECHNICAL FIELD

The present disclosure generally relates to the technique field of touch screen, and more particularly, to a display panel of a touch screen and an electronic device.

BACKGROUND

Existing touch screens, such as liquid crystal displays, are able to determine a specific position where a user is touching according to capacitance change being detected.

However, in existing liquid crystal touch screens, a visible pattern of connect portions may exist. In other words, an image illustrated by an existing liquid crystal touch screen may have non-uniformity.

Accordingly, a display panel of a touch screen, which is adapted to eliminate the visible pattern phenomenon, and avoid non-uniformity of an image being displayed, is required.

SUMMARY

According to one embodiment of the present disclosure, a display panel of a touch screen is provided. The display panel of the touch screen includes: a color filter substrate and an array substrate. The color filter substrate and the array substrate are configured in a face to face position. The color filter substrate includes a black matrix. The array substrate includes a plurality of pixel units and a plurality of touch control unit. The plurality of pixel units include first pixel units and second pixel units arranged in a two-dimensional matrix. Each row of the two-dimensional matrix includes only the first pixel units or only the second pixel units. In each column of the two-dimensional matrix, the first pixel units are not adjacent to each other and the second pixel units are not adjacent to each other. Each of the first pixel units includes a first sub-pixel for displaying a first color, a second sub-pixel for displaying a second color, a third sub-pixel for displaying a third color, and a fourth sub-pixel for displaying a fourth color, all of the four colors are arranged in sequence in a row direction of the two-dimensional matrix. Each of the second pixel units includes a fifth sub-pixel for displaying the third color, a sixth sub-pixel for displaying the fourth color, a seventh sub-pixel for displaying the first color and an eighth sub-pixel for displaying the second color, which are arranged in sequence in the row direction of the two-dimensional matrix. The fourth color is white, and the fourth sub-pixel and the sixth sub-pixel each is a white sub-pixel. The white sub-pixel includes a first region and a second region, and the second region is sheltered by the black matrix from a light emitting direction of the display panel. Each of the plurality of touch control units includes a touch control electrode, a touch control line, and a connect component through which the touch electrode is connected with the touch control line, the touch control electrodes are arranged in an array, and the connect component is set in the second region.

According to one embodiment of the present disclosure, a display panel of a touch screen is provided. The display panel of the touch screen includes: a color filter substrate and an array substrate. The color filter substrate and the array substrate are configured in a face to face position. The color filter substrate includes a black matrix. The array substrate includes a plurality of pixel units and a plurality of touch control unit. The plurality of pixel units include first pixel units and second pixel units arranged in a two-dimensional matrix. In each row and each column of the two-dimensional matrix the first pixel units are not adjacent to each other and the second pixel units are not adjacent to each other. Each of the first pixel units includes a first sub-pixel for displaying a first color, a second sub-pixel for displaying a second color and a third sub-pixel for displaying a third color, which are arranged in sequence in a row direction of the two-dimensional matrix. Each of the second pixel units includes a fourth sub-pixel for display the first color, a fifth sub-pixel for displaying the second color and a sixth sub-pixel for displaying a fourth color, which are arranged in sequence in the row direction of the two-dimensional matrix. The fourth color is white, and the sixth sub-pixel is a white sub-pixel. The white sub-pixel includes a first region and a second region, and the second region is sheltered by the black matrix from a light emitting direction of the display panel. Each of the plurality of touch control units includes a touch control electrode, a touch control line, and a connect component through which the touch electrode is connected with the touch control line, the touch control electrodes are arranged in an array, and the connect component is set in the second region.

According to one embodiment of the present disclosure, a display panel of a touch screen is provided. The display panel of the touch screen includes: a color filter substrate and an array substrate. The color filter substrate and the array substrate are configured in a face to face position. The color filter substrate includes a black matrix. The array substrate includes a plurality of pixel units and a plurality of touch control unit. The plurality of pixel units include first pixel units and second pixel units arranged in a two-dimensional matrix. Each column of the two-dimensional matrix includes only the first pixel units or only the second pixel units. In each row of the two-dimensional matrix, the first pixel units are not adjacent to each other and the second pixel units are not adjacent to each other. Each of the first pixel units includes a first sub-pixel for displaying a first color, a second sub-pixel for displaying a second color and a third sub-pixel for displaying a third color, which are arranged in sequence in a row direction of the two-dimensional matrix. Each of the second pixel units includes a fourth sub-pixel for display the first color, a fifth sub-pixel for displaying the second color and a sixth sub-pixel for displaying a fourth color, which are arranged in sequence in the row direction of the two-dimensional matrix. The fourth color is white, and the sixth sub-pixel is a white sub-pixel. The white sub-pixel includes a first region and a second region, and the second region is sheltered by the black matrix from a light emitting direction of the display panel. Each of the plurality of touch control units includes a touch control electrode, a touch control line, and a connect component through which the touch electrode is connected with the touch control line, the touch control electrodes are arranged in an array, and the connect component is set in the second region.

According to the embodiments, the white sub-pixel includes a first region and a second region; wherein the first region has an area less than that occupied by the white sub-pixel and is used for setting a pixel electrode; wherein the second region is sheltered by the black matrix from a light emitting direction of the display panel; and wherein the connect component between the touch control lines and the touch control electrodes is set in the second region of the white sub-pixel. The second region is sheltered by the black matrix, thus the problem of visible pattern of connect portions can be solved.

DETAILED DESCRIPTION

In order to clarify the objects, characteristics and advantages of the present disclosure, embodiments of the present disclosure will be described in detail in conjunction with the accompanying drawings. The disclosure will be described with reference to certain embodiments. Accordingly, the present disclosure is not limited to the embodiments disclosed. It will be understood by those skilled in the art that various changes may be made without departing from the spirit or scope of the disclosure.

Figure 1:
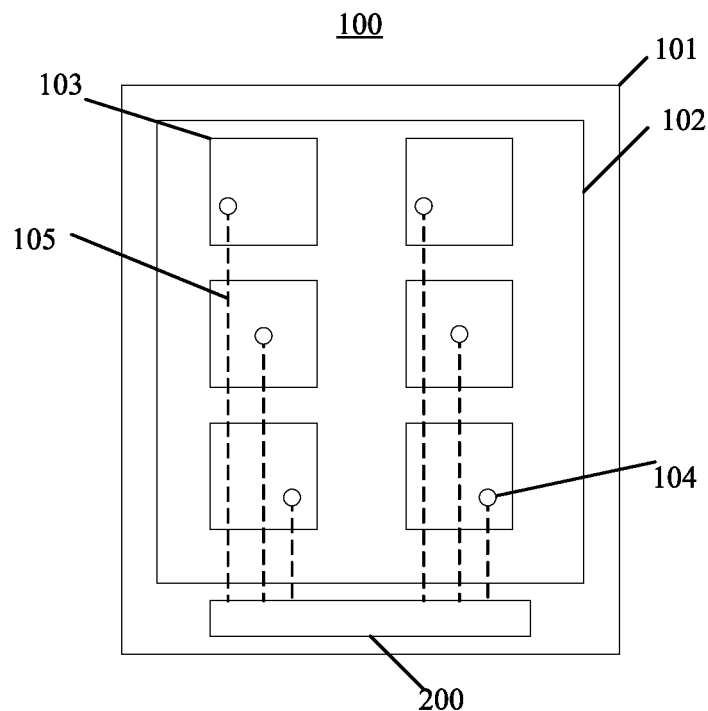
FIG. 1 schematically illustrates an example of a touch screen.

Referring to FIG. 1, an example of a touch screen is illustrated. The touch screen 100 includes a peripheral region 101 and an active region 102.

An array substrate corresponding to the active region 102 is configured with touch control electrodes 103. Each of the touch control electrodes 103 is connected with a touch detecting chip 200 through a touch control line 105. The touch electrodes 103 and the touch control lines 105 are located on different layers, thus vias 104 are required. Specifically, each touch control line 105 is connected with the corresponding touch control electrode 103 through a vias 104. As shown in FIG. 1, each touch control electrode 103 is configured with the via 104 thereon.

Each of the touch control electrodes 103 is independently connected with the touch detecting chip 200 through the corresponding touch control line 105. Thus, portions of the substrate where the touch control lines 105 and the vias 104 located are different, which will cause a visible pattern phenomenon.

In the present disclosure, a display panel of a touch screen is provided. The display panel includes: a color filter substrate and an array substrate, which are disposed in a face to face position.

The color filter substrate includes a black matrix. The array substrate includes: a plurality of pixel units and a plurality of touch control units; wherein at least one of the plurality of pixel units includes multiple sub-pixels; wherein the multiple sub-pixels at least include one white sub-pixel; wherein the white sub-pixel includes a first region and a second region; wherein the second region is sheltered by the black matrix from a light emitting direction of the display panel; wherein each of the plurality of touch control units includes a touch control electrode, a touch control line and a connect component; wherein the touch control electrodes are arranged in an array; wherein regarding each touch control unit, the touch control line is connected with the touch control electrode through the connect component; and wherein the connect component is set in the second region.

Figure 2:
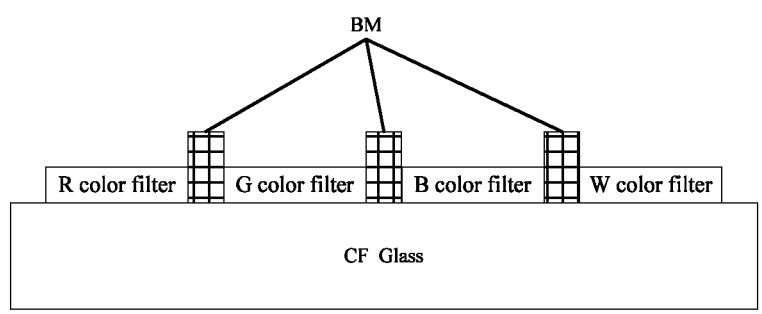
FIG. 2 schematically illustrates a sectional view of a color substrate according to one embodiment of the present disclosure.

Referring to FIG. 2, a sectional view of a color filter substrate according to one embodiment of the present disclosure is illustrated. The color filter substrate includes a BM (Black Matrix) and a color filter layer which lie on one side of the CF Glass. The color filter layer includes a plurality of color filter units, and each of the color filter units includes a red color R (red) color filter, a G (green) color filter, a B (blue) color filter and a W (white) color filter. Between each two neighboring color filters, a BM is set for blocking lights.

Figure 3:
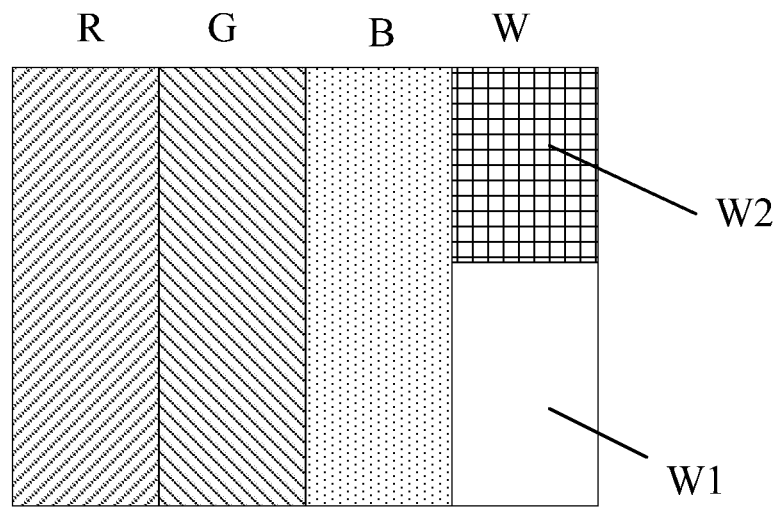
FIG. 3 schematically illustrates a top view of an array substrate according to one embodiment of the present disclosure.

Referring to FIG. 3, a top view of an array substrate according to one embodiment of the present disclosure is illustrated. The array substrate includes a plurality of pixel units. We will take one pixel unit in the array substrate as an example for illustration.

It should be noted that, neither every pixel unit in the array substrate is required including multiple sub-pixels or including a white color sub-pixel, as long as the portion of the substrate corresponding to the touch control electrode includes the white sub-pixel.

In this embodiment, each pixel unit includes a R (red) sub-pixel, a G (green) sub-pixel, a B (blue) sub-pixel, and a W (white) sub-pixel, which is just for exemplary illustration. Further, areas occupied by the R sub-pixel, the G sub-pixel, the B sub-pixel, and the W sub-pixel are equal.

The W sub-pixel includes a first region W1 and a second region W2; wherein an area of the first region is smaller than that covered by the W sub-pixel, the first region W1 is used for setting a pixel electrode P; and the second region W2 is sheltered by the BM from a light emitting direction of the display panel.

It can be understood that, proportions of the first region W1 and the second region W2 to the W sub-pixel may be determined according to specific requirement, which should not taken as a limitation.

Figure 4:
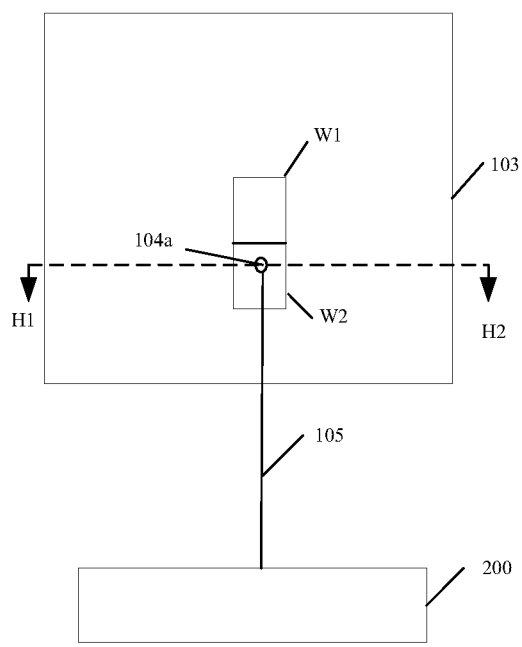
FIG. 4 schematically illustrates another top view of the array substrate according to the above embodiment of the present disclosure.

Referring to FIG. 4, a top view of an array substrate according to one embodiment of the present disclosure is illustrated.

It can be understood that, the array substrate includes a plurality of touch control units which are arranged in an array. Furthermore, each touch control unit includes a touch control electrode, a touch control line and a connect component.

Structures of each touch control unit in the array substrate are identical, thus we take one touch control unit for exemplary illustration.

As shown in FIG. 4, a touch control unit is illustrated. The touch control unit includes a touch control electrode 103, and a touch control line 105, wherein the touch control electrode 103 is connected with a touch detecting chip 200 through the touch control line 105. The touch control electrode 103 is electrically connected with the touch control line 105, thus form a connect component 104a.

In the present disclosure, the connect component 104a is set in the second region W2 of the W sub-pixel, and second region W2 of the W sub-pixel is sheltered by the BM from a light emitting direction of the display panel. As such, problem of the visible pattern phenomenon exited in the prior art can be solved.

Amount of lights emitting from the W sub-pixel can be adjusted by controlling an area of the first region W1.

It can be understood that, in the present disclosure, the problem of visible pattern phenomenon can be solved, as the connect component between the touch control electrode and the touch control line is set in the second region of the W sub-pixel, and the second region is sheltered by the BM.

In some embodiments, an area occupied by the second region W2 is less than or equal to 70% that of an area occupied by the W sub-pixel. For example, the area occupied by the second region W2 is 30%, 40%, 50%, or 60% that of an area occupied by the W sub-pixel. The specific area occupied by the second region W2 can be determined according to practical requirements.

It can be understood that, the first region W1 in the W sub-pixel is configured with pixel electrode, and second region W2 is sheltered by the BM, thus a shape of the second region W2 may change according to a shape of the BM.

The shape of the BM may be one selected from a group consisting of rectangle, triangle, rectangle ring shape, L shape, and reversed L shape.

Figure 5A:
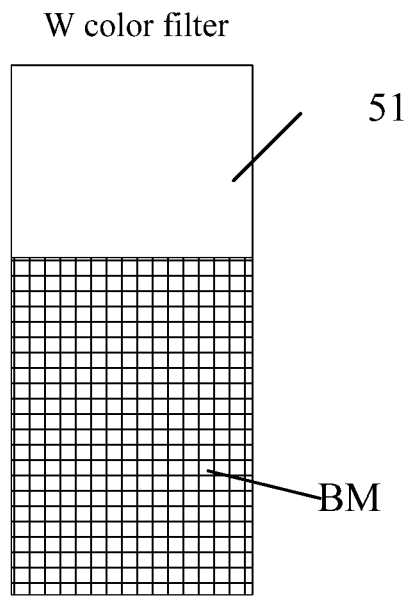
FIG. 5a schematically illustrates a top view of a white color filter on a color filter substrate according to one embodiment of the present disclosure.

Referring to FIG. 5a, a top view of a W color filter on the color filter substrate is illustrated. As shown, the BM is in rectangle shape.

Figure 5B:
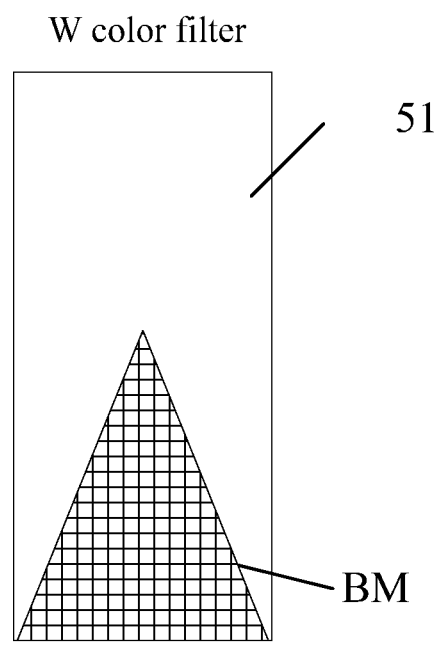
FIG. 5b schematically illustrates a top view of a white color filter on a color filter substrate according to another embodiment of the present disclosure.
Figure 5C:
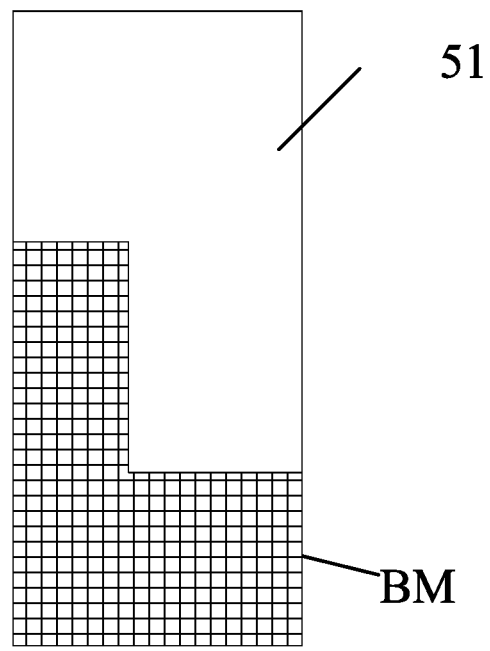
FIG. 5c schematically illustrates a top view of a white color filter on a color filter substrate according to another embodiment of the present disclosure.

Similarly, the BM also can be configured into a triangle shape as shown in FIG. 5b, or L shape as shown in FIG. 5c.

It can be understood that, an area of the W color filter can be configured equal to that occupied by the first region 51. Or the area of the W color filter can be configured equal to that occupied by the entire W sub-pixel, that is, the area occupied by the first region 51 plus an area occupied by the BM, as shown in FIG. 5a.

In other words, regarding the color filter substrate, the W color filter can be configured smaller than or equal to the R color filter. When the W color filter is configured equal to the R color filter, a portion of the W color filter is sheltered by the BM.

It should be noted that, in the touch screen, the touch control electrodes and the common electrodes can be configured independently. Or, the touch control electrodes and the common electrodes are a common set of electrodes.

When the touch control electrodes and the touch control lines are set on different layers, vias are required for electrically connecting the touch control electrodes and the touch control lines, respectively.

Figure 6:
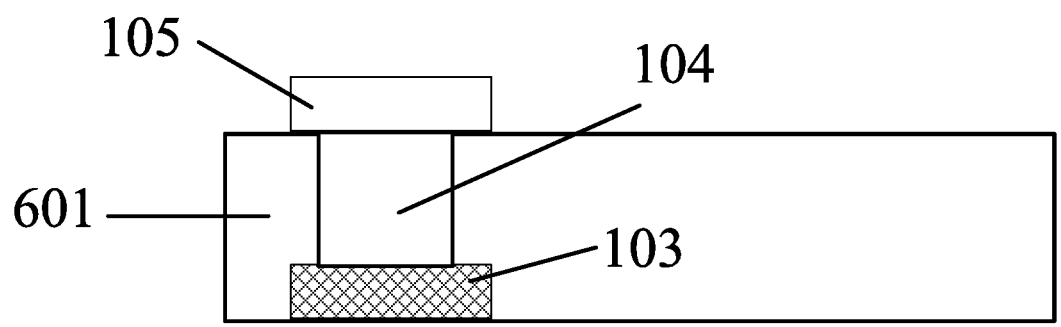
FIG. 6 schematically illustrates a sectional view of the array substrate along H1-H2 in FIG. 4.

As shown in FIG. 6, the touch control electrode 103 is set on a first metal layer, the touch control line 105 is set on a second metal layer, and the touch control electrode 103 is electrically connected with the touch control line 105 through a via 104.

Furthermore, the first metal layer and the second metal layer are configured with an insulating layer 601 therebetween. In some embodiments, the insulating layer 601 is an organic membrane.

In addition, in the prior art, in order to improve an aperture ratio thereof, a width of the BM is generally configured small. Furthermore, the touch control line is required being sheltered by the BM, so as to improve the aperture ratio. Thus, a width of the touch control line is also required to be small. As a result, resistance of the touch control line is increased. Furthermore, distances between different touch control electrodes and the touch detecting chip are different from each other, thus resistances of the plurality of touch control lines are inconsistent. For example, regarding a touch control electrode located farther from the touch detecting chip, a longer touch control line is required, thus the resistance of the touch control line is larger.

The technique solution provided by the present disclosure can also solve the problem of resistance inconsistence between the plurality of touch control lines.

Figure 7:
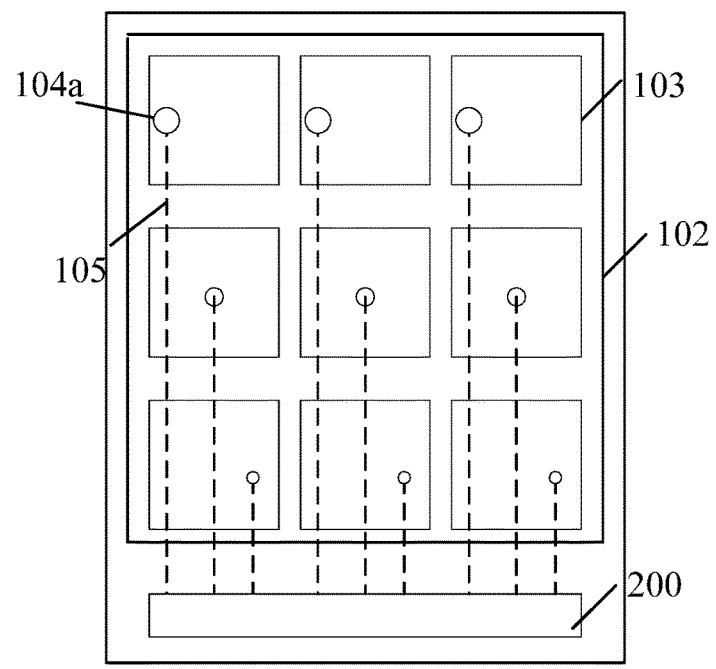
FIG. 7 schematically illustrates an array substrate according to another embodiment of the present disclosure.

Referring to FIG. 7, an array substrate according to another embodiment of the present disclosure is illustrated.

In this embodiment, the array substrate includes: a touch detecting chip 200; a plurality of touch control electrodes 103; a plurality of touch control lines 105, and a plurality of connect components 104a.

The touch detecting chip 200 is set on a peripheral region of the display panel, wherein the peripheral region encircles a display region 102 as shown in FIG. 7.

The plurality of touch control electrodes 103 are connected with the touch detecting chip 200 through the plurality of touch control lines 105, respectively.

An area of the connect component 104a is determined according to a distance between the connect component 104a and the touch detecting chip 200. Specifically, areas of the connect components 104a gradually reduce along with the decrease of distances between the connect components 104a and the touch detecting chip 200.

As shown in FIG. 7, the display panel includes a display region 102 and a peripheral region encircling the display region 102. The touch detecting chip 200 is located on a lower side of the peripheral region. A direction from an upper side of the peripheral region to the lower side of the peripheral region is defined as a first direction. Accordingly, along the first direction, the areas of the connect components progressively decrease. It should be noted that, the upper side is the side farther from the touch detecting chip 200, while the lower side is opposite to the upper side and nearer to the touch detecting chip 200.

In FIG. 7, there are three lines and three columns of touch control electrodes for exemplary illustration.

From the upper side to the lower side, the touch control electrodes are defined as a first line of touch control electrodes, a second line of touch control electrodes, and a third line of touch control electrodes, respectively.

As the first line of touch control electrodes is the farthest one away from the touch detecting chip 200, thus corresponding touch control lines are the longest. The longer the touch control line, the larger the resistance of the touch control line. Therefore, in order to reduce the resistance of the touch control line, an area of the corresponding connect component is required to be increased. In other words, the connect components corresponding to the first line of touch control electrodes are the largest, the connect components corresponding to the third line of touch control electrodes are the smallest, and the connect components corresponding to the second line of touch control electrodes are between that of the first line and the third line.

It can be understood that, in the present disclosure, the resistance of the touch control line is controlled by adjusting the area of the connect component. Specifically, when the area of the connect component is enlarged, the resistance of the corresponding touch control line is reduced. As such, load on the touch control line can be reduced according to practical requirements, so as to improve the touching performance of the entire display panel.

As shown in FIG. 7, the touch control electrode and the touch control line are located on different layers, and the touch control electrode and the touch control line are electrically connected through the via. In this case, sizes of all touch control electrodes are equal. Furthermore, one touch control line only connects with one touch control electrode and passes through the other touch control electrodes. In other words, the touch control line corresponding to one touch control electrode is not electrically connected with other touch control electrodes.

When the touch control electrode and the touch control line are located on a same layer, the touch control line corresponding to one touch control electrode should be electrically isolated from the other touch control electrodes. Thus, sizes of touch control electrodes in different lines may be different, so as to save space for the touch control lines corresponding to other touch control electrodes.

Figure 8:
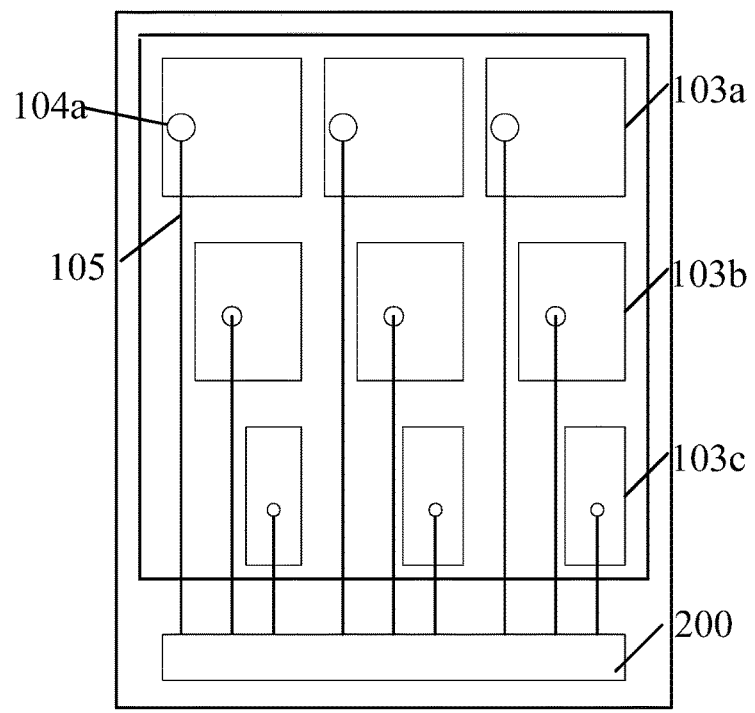
FIG. 8 schematically illustrates an array substrate according to another embodiment of the present disclosure.

Referring to FIG. 8, an array substrate according to another embodiment of the present disclosure is illustrated.

In the array substrate, the touch control electrodes and the touch control lines are located on a same layer. Thus, sizes of the touch control electrodes decrease along the first direction. Each touch control line is directly connected with the corresponding touch control electrode. The touch control line of one touch control unit is electrically insulated from the touch control electrodes of other touch control units.

As shown in FIG. 8, there are three lines and three columns of touch control electrodes, which is for exemplary illustration. Size of the first line of touch control electrodes is the largest, size of the third line of touch control electrodes is the smallest, and size of the second line of touch control electrodes is in between. In other words, the farther the touch control electrode away from the touch detecting chip 200, the larger the size of the touch control electrode. The touch control electrodes in the second line are required to save some space for the touch control lines corresponding to the touch control electrodes in the first line. The touch control electrodes in the third line are required to save some space for the touch control lines corresponding to the touch control electrodes both in the first line and in the second line. As such, the touch control lines corresponding to the touch control electrodes in one line will not cross over the touch control electrodes in the other lines.

It can be understood that, even size configuration of the touch control electrodes in the array substrate as shown in FIG. 8 is different from that in the array substrate as shown in FIG. 7, the configurations of the connect components as recited relating to the array substrate in FIG. 7 are also applicable to the array substrate in FIG. 8. Specifically, in the array substrate as shown in FIG. 8, the larger a distance between the touch control electrode and the touch detecting chip, the longer the touch control line corresponding to the touch control electrode, vice versa. Thus, in order to solve the resistance inconsistence between different touch control lines, the connect components can be configured as following.

An area of the connect component 104*a* can be configured according to a distance between the connect component 104*a* and the touch detecting chip 200. Specifically, areas of the connect components 104*a* gradually reduce along with the decrease of distances between the connect components 104*a* and the touch detecting chip 200.

It should be noted that, one touch control unit is generally corresponded to an integral number of pixel units. In other words, one touch control unit corresponds to a plurality of pixel units.

Each touch control electrode is configured corresponding to at least one W subs-pixel, and the connect component between the touch control electrode and the touch control line is set in the second region of the W sub-pixel and sheltered by the BM.

It should be noted that, the number of the W sub-pixel corresponding to one touch control electrode is not limited by the present disclosure.

Figure 9A:
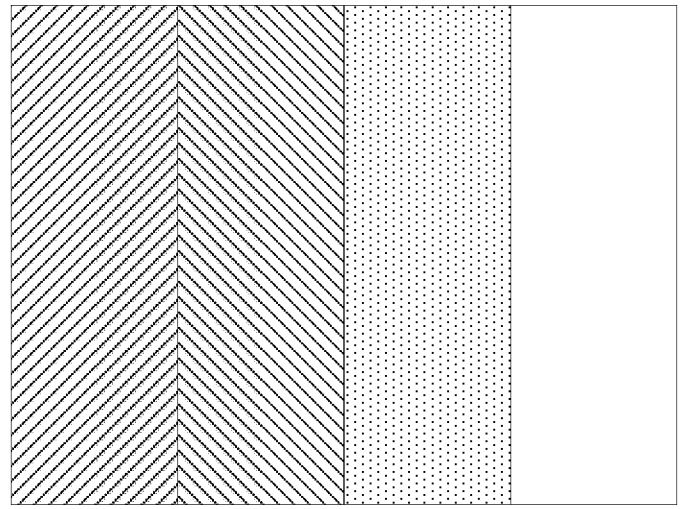
FIG. 9a schematically illustrates an arrangement of a pixel unit according to one embodiment of the present disclosure.

Furthermore, the arrangement of the sub-pixels is not limited as well. For example, as shown in FIG. 9*a*, the sub-pixels are arranged (from left to right) in an order of: R sub-pixel, G sub-pixel, B sub-pixel, and W sub-pixel.

Figure 9B:
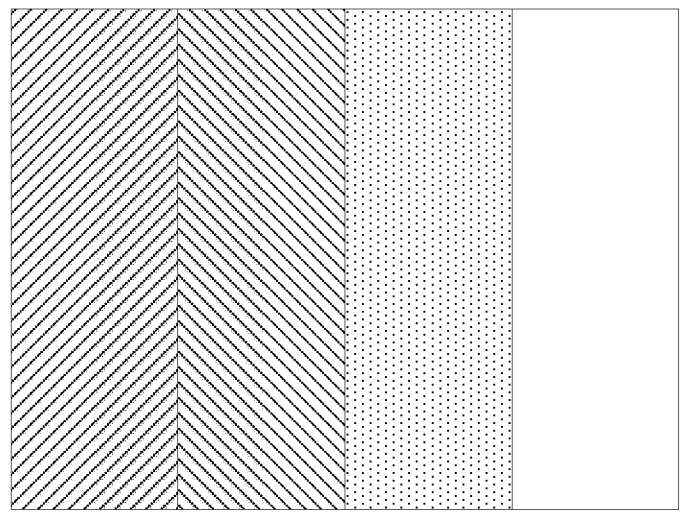
FIG. 9b schematically illustrates an arrangement of a pixel unit according to another embodiment of the present disclosure.

Alternatively, the sub-pixels can be arranged in an order of: R sub-pixel, G sub-pixel, W sub-pixel, and B sub-pixel, as shown in FIG. 9*b*.

Figure 9C:
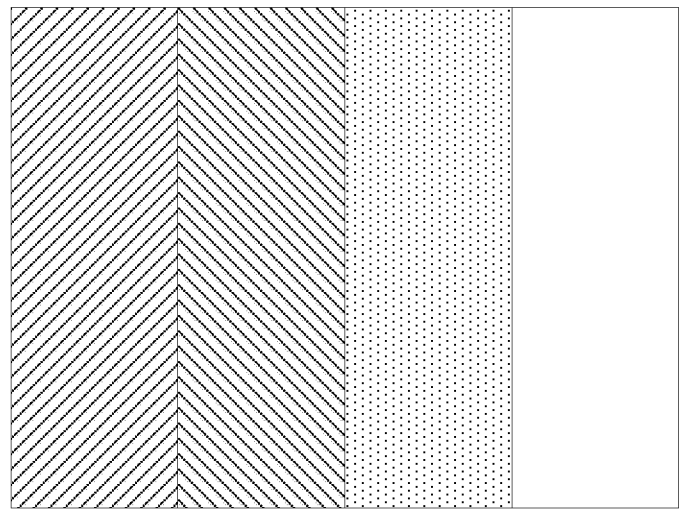
FIG. 9c schematically illustrates an arrangement of a pixel unit according to another embodiment of the present disclosure.

Alternatively, the sub-pixels can be arranged in an order of: R sub-pixel, W sub-pixel, G sub-pixel, and B sub-pixel, as shown in FIG. 9*c*.

The arrangement of the pixel units will be described below in FIG. 10-FIG. 12.

Figure 10:
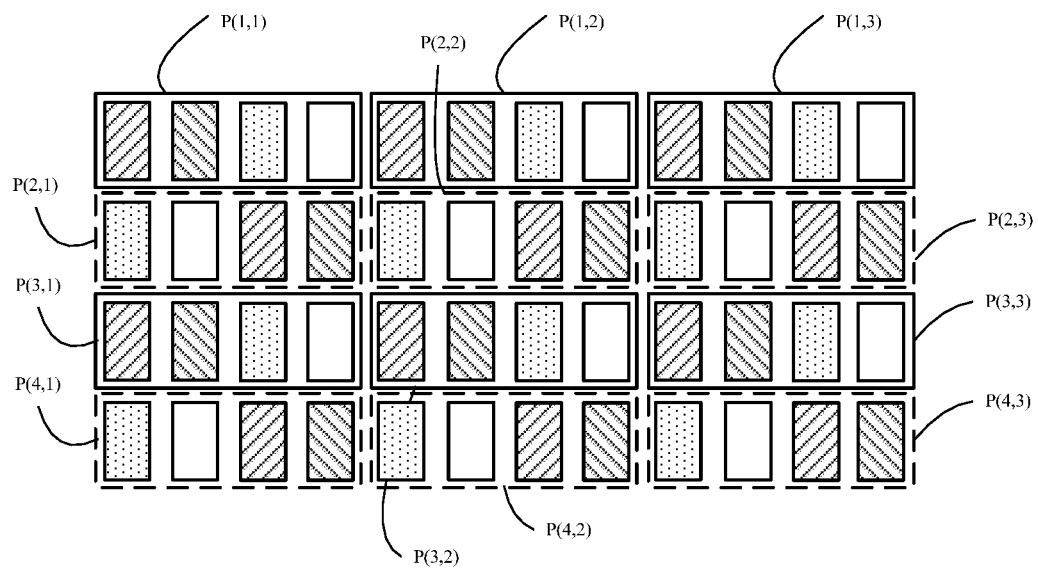
FIG. 10 schematically illustrates an arrangement of pixel units according to one embodiment of the present disclosure.

FIG. 10 illustrates an arrangement of the pixel units according to one embodiment of the present disclosure.

As shown in FIG. 10, the multiple pixel units include first pixel units and second pixel units arranged in a two-dimensional matrix. In FIG. 10, the first pixel unit and the second pixel unit are distinguished by whether the region is enclosed in solid lines b or dash lines. In an implementation, the region enclosed by the solid lines indicates the first pixel unit and the region enclosed by the dash lines indicates the second pixel unit.

In FIG. 10, the first pixel units and the second pixel units form a two-dimensional matrix with four rows and three columns. In the two-dimensional matrix, the pixel units in the first row are all first pixel units, i.e., all of the pixel unit P(1, 1) on the first row and the first column, the pixel unit P(1, 2) on the first row and the second column and the pixel unit P(1, 3) on the first row and the third column are the first pixel units. In the two-dimensional matrix, the pixel units in the second row are all second pixel units, i.e., all of the pixel unit P(2, 1) on the second row and the first column, the pixel unit P(2, 2) on the second row and the second column and the pixel unit P(2, 3) on the second row and the third column are the second pixel units. In the two-dimensional matrix, the pixel units in the third row are all first pixel units, i.e., all of the pixel unit P(3, 1) on the third row and the first column, the pixel unit P(3, 2) on the third row and the second column and the pixel unit P(3, 3) on the third row and the third column are the first pixel units. In the two-dimensional matrix, the pixel units in the fourth row are all second pixel units, i.e., all of the pixel unit P(4, 1) on the fourth row and the first column, the pixel unit P(4, 2) on the fourth row and the second column and the pixel unit P(4, 3) on the fourth row and the third column are the second pixel units. From the above, each row of the two-dimensional matrix includes only the first pixel units or only the second pixel units, and in each column of the two-dimensional matrix the first pixel units are not adjacent to each other and the second pixel units are not adjacent to each other.

Also shown in FIG. 10, the first pixel unit includes four sub-pixels arranged in sequence in the row direction of the two-dimensional matrix, which includes a first sub-pixel for displaying a first color, a second sub-pixel for displaying a second color, a third sub-pixel for displaying a third color and a fourth sub-pixel for displaying a fourth color, respectively. The second pixel unit includes four different sub-pixels arranged in sequence in the row direction of the two-dimensional matrix, which are a fifth sub-pixel for displaying the third color, a sixth sub-pixel for displaying the fourth color, a seventh sub-pixel for displaying the first color and an eighth sub-pixel for displaying the second color, respectively.

In an implementation, the first color is red, the second color is green, the third color is blue and the fourth color is white.

In another implementation, the first color is red, the second color is green, the third color is blue and the fourth color is yellow.

In an implementation, the ratio of the length of the sub-pixel in the row direction of the two-dimensional matrix to the length of the sub-pixel in the column direction of the two-dimensional matrix is 1:2.

In another implementation, the ratio of the length of the sub-pixel in the row direction of the two-dimensional matrix to the length of the sub-pixel in the column direction of the two-dimensional matrix is 1:3.

A two-dimensional matrix with four rows and three columns is illustrated in FIG. 10. It should be noted that the application is not limited to a two-dimensional matrix with four rows and three columns, and more or less rows and columns can be included.

Figure 11:
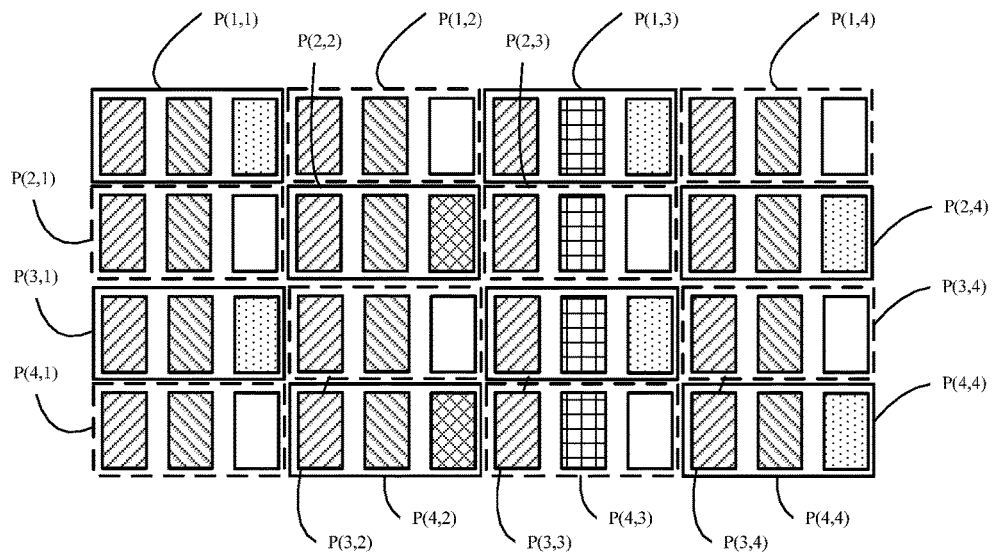
FIG. 11 schematically illustrates an arrangement of pixel units according to another embodiment of the present disclosure.

FIG. 11 illustrates an arrangement of the pixel units according to another embodiment of the present disclosure.

As shown in FIG. 11, the multiple pixel units include the first pixel units and the second pixel units arranged in a two-dimensional matrix. In FIG. 11, the first pixel unit and the second pixel unit are distinguished by whether the region is enclosed with solid lines or -dash lines. In an implementation, the region enclosed with solid lines indicates the first pixel unit and the region enclosed by the dash lines indicates the second pixel unit.

In FIG. 11, the first pixel units and the second pixel units form a two-dimensional matrix with four rows and four columns. In the two-dimensional matrix, the pixel units in the first row include first pixel units and second pixel units which are arranged alternatively. In the first row, the pixel unit P(1, 1) on the first row and the first column is the first pixel unit, the pixel unit P(1, 2) on the first row and the second column is the second pixel unit, the pixel unit P(1, 3) on the first row and the third column is the first pixel unit, and the pixel unit P(1, 4) on the first row and the fourth column is the second pixel unit. In the two-dimensional matrix, the pixel units in the second row include first pixel units and second pixel units which are arranged alternatively. In the second row, the pixel unit P(2, 1) on the second row and the first column is the second pixel unit, the pixel unit P(2, 2) on the second row and the second column is the first pixel unit, the pixel unit P(2, 3) on the second row and the third column is the second pixel, and the pixel unit P(2, 4) on the second row and the fourth column is the first pixel unit. In the two-dimensional matrix, the pixel units in the third row include first pixel units and second pixel units which are arranged alternatively. In the third row, the pixel unit P(3, 1) on the third row and the first column is the first pixel unit, the pixel unit P(3, 2) on the third row and the second column is the second pixel unit, the pixel unit P(3, 3) on the third row and the third column is the first pixel unit, and the pixel unit P(3, 4) on the third row and the fourth column is the second pixel unit. In the two-dimensional matrix, the pixel units in the fourth row include first pixel units and second pixel units which are arranged alternatively. In the fourth row, the pixel unit P(4, 1) on the fourth row and the first column is the second pixel unit, the pixel unit P(4, 2) on the fourth row and the second column is the first pixel unit, the pixel unit P(4, 3) on the fourth row and the third column is the second pixel unit, and the pixel unit P(4, 4) on the fourth row and the fourth column is the first pixel unit. From the above, in each row and in each column of the two-dimensional matrix the first pixel units are not adjacent to each other and the second pixel units are not adjacent to each other.

As shown in FIG. 11, the first pixel unit includes three different sub-pixels arranged in sequence in the row direction of the two-dimensional matrix, which are a first sub-pixel for displaying a first color, a second sub-pixel for displaying a second color and a third sub-pixel for displaying a third color, respectively. The second pixel unit includes three different sub-pixels arranged in sequence in the row direction of the two-dimensional matrix, which are a fourth sub-pixel for displaying the first color, a fifth sub-pixel for displaying the second color and a sixth sub-pixel for displaying a fourth color, respectively.

In an implementation, the first color is red, the second color is green, the third color is blue and the fourth color is white.

In another implementation, the first color is red, the second color is green, the third color is blue and the fourth color is yellow.

A two-dimensional matrix with four rows and four columns is illustrated in FIG. 11. It should be noted that the application is not limited to the two-dimensional matrix with four rows and four columns, and more or less rows and columns can be included.

Figure 12:
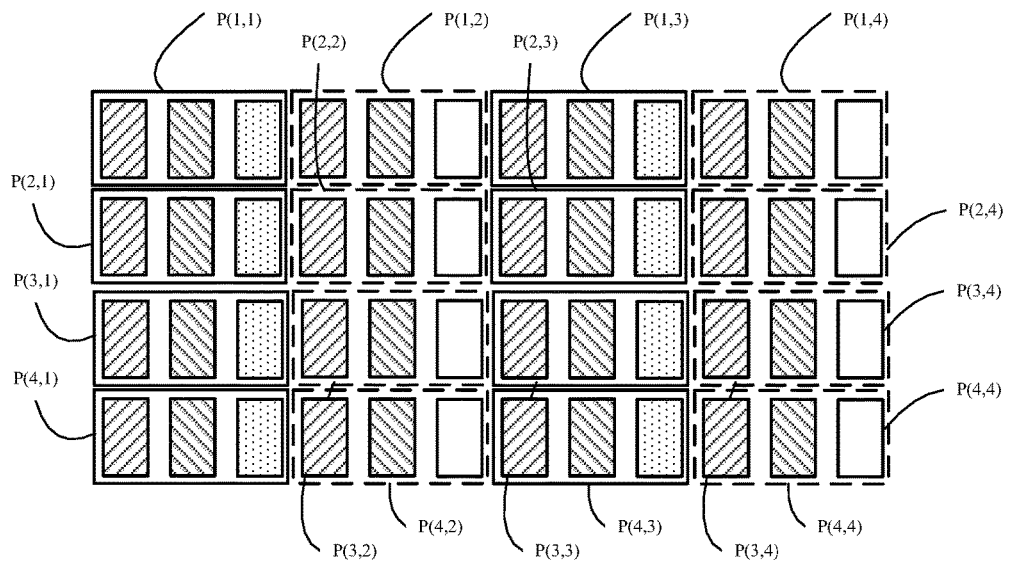
FIG. 12 schematically illustrates an arrangement of pixel units according to another embodiment of the present disclosure.

FIG. 12 illustrates an arrangement of the pixel units according to another embodiment of the present disclosure.

As shown in FIG. 12, the multiple pixel units include first pixel units and second pixel units arranged in a two-dimensional matrix. In FIG. 12, the first pixel unit and the second pixel unit are distinguished by the region enclosed by the full line and the region enclosed by the dash line. In an implementation, the region enclosed by the full line indicates the first pixel unit and the region enclosed by the dash line indicates the second pixel unit.

In FIG. 12, the first pixel units and the second pixel units form a two-dimensional matrix with four rows and four columns. In the two-dimensional matrix, the pixel units in the first column are all first pixel units, i.e., all of the pixel unit P(1, 1) on the first row and the first column, the pixel unit P(2, 1) on the second row and the first column, the pixel unit P(3, 1) on the third row and the first column and the pixel unit P(4, 1) on the fourth row and the first column are first pixel units. In the two-dimensional matrix, the pixel units in the second column are all second pixel units, i.e., all of the pixel unit P(1, 2) on the first row and the second column, the pixel unit P(2, 2) on the second row and the second column, the pixel unit P(3, 2) on the third row and the second column and the pixel unit P(4, 2) on the fourth row and the second column are second pixel units. In the two-dimensional matrix, the pixel units in the third column are all first pixel units, i.e., all of the pixel unit P(1, 3) on the first row and the third column, the pixel unit P(2, 3) on the second row and the third column, the pixel unit P(3, 3) on the third row and the third column and the pixel unit P(4, 3) on the fourth row and the third column are the first pixel units. In the two-dimensional matrix, the pixel units in the fourth column are all second pixel units, i.e., all of the pixel unit P(1, 4) on the first row and the fourth column, the pixel unit P(2, 4) on the second row and the fourth column, the pixel unit P(3, 4) on the third row and the fourth column and the pixel unit P(4, 4) on the fourth row and the fourth column are second pixel units. From the above, each column of the two-dimensional matrix includes only either the first pixel units or the second pixel units, and in each row of the two-dimensional matrix the first pixel units are not adjacent to each other and the second pixel units are not adjacent to each other.

As shown in FIG. 12, the first pixel unit includes three different sub-pixels arranged in the row direction of the two-dimensional matrix, which are a first sub-pixel for displaying a first color, a second sub-pixel for displaying a second color and a third sub-pixel for displaying a third color, respectively. The second pixel unit includes three different sub-pixels arranged in the row direction of the two-dimensional matrix, which are a fourth sub-pixel for displaying the first color, a fifth sub-pixel for displaying the second color and a sixth sub-pixel for displaying a fourth color, respectively.

In an implementation, the first color is red, the second color is green, the third color is blue and the fourth color is white.

In another implementation, the first color is red, the second color is green, the third color is blue and the fourth color is yellow.

A two-dimensional matrix with four rows and four columns is illustrated in FIG. 12. It should be noted that the application is not limited to a two-dimensional matrix with four rows and four columns, other numbers of rows and columns can be included.

It should be noted that, the liquid crystal in the display panel can be driven by way of: IPS (In Plane Switching), or FFS (Fringe Filed Switching). The display panel can be a self capacitive display panel or a mutual capacitive display panel.

Figure 13:
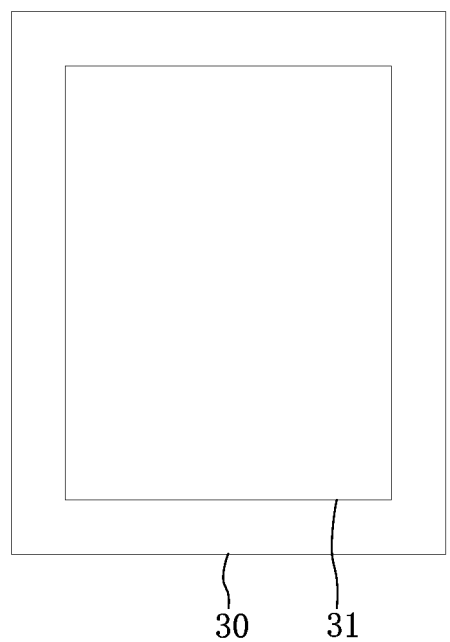
FIG. 13 schematically illustrates an electronic device according to one embodiment of the present disclosure.

Referring to FIG. 13, an electronic device according to one embodiment of the present disclosure is illustrated. The electronic device includes any one of the display panels recited above.

The electronic device 30 includes a display panel 31, and a drive circuit (not pictured). The electronic device may further include any other component for supporting normal working of the electronic device 30.

The display panel 31 can be any one of the display panels provided by embodiments recited above. The electronic device may be a mobile phone, a desktop computer, a laptop computer, a tablet, or a piece of electronic paper.

Although the present disclosure has been disclosed above with reference to preferred embodiments thereof, it should be understood by those skilled in the art that various changes may be made without departing from the spirit or scope of the disclosure. Accordingly, the present disclosure is not limited to the embodiments disclosed.

What is claimed is:

1. A display panel of a touch screen, comprising:
    a color filter substrate and an array substrate, wherein the color filter substrate and the array substrate are arranged in a face to face position;
    wherein the color filter substrate comprises a black matrix;
    wherein the array substrate comprises a plurality of pixel units and a plurality of touch control units;
    wherein the plurality of pixel units comprise a plurality of first pixel units and a plurality of second pixel units, both arranged in a two-dimensional matrix, wherein each row of the two-dimensional matrix comprises either the first pixel units or the second pixel units,
    wherein the first pixel units are not adjacent to each other and the second pixel units are not adjacent to each other within a same column of the two-dimensional matrix,
    wherein the first pixel units each comprises a first sub-pixel for displaying a first color, a second sub-pixel for displaying a second color, a third sub-pixel for displaying a third color and a fourth sub-pixel for displaying a fourth color, wherein all the said sub-pixels are arranged in sequence in a row direction of the two-dimensional matrix, and
    wherein the second pixel units each comprises a fifth sub-pixel for displaying the third color, a sixth sub-pixel for displaying the fourth color, a seventh sub-pixel for displaying the first color and an eighth sub-pixel for displaying the second color, wherein all the said sub-pixels are arranged in sequence in the row direction of the two-dimensional matrix,
    wherein the fourth color is white, and the fourth sub-pixel and the sixth sub-pixel are white sub-pixels,
    wherein the white sub-pixel comprises a first region and a second region, and wherein the second region is sheltered by the black matrix from a light emitting direction of the display panel;
    wherein each of the plurality of touch control units comprises a touch control electrode, a touch control line, and a connect component through which the touch electrode is electrically connected with the touch control line, the plurality of touch control electrodes are arranged in an array, and
    wherein at least the connect components is set in the second region.

2. The display panel of a touch screen according to claim 1, wherein an area of the second region is less than or equal to 70% area of the entire white sub-pixel.

3. The display panel of a touch screen according to claim 1, further comprising a touch detecting sensor; wherein the touch control electrode is connected with the touch detecting sensor through the touch control line; and wherein an area of the connect component gradually reduces as the connect component gets closer to the touch detecting sensor.

4. The display panel of a touch screen according to claim 3, wherein the display panel comprises a display region and a peripheral region encircling the display region; wherein the peripheral region has a first side and a second side opposite to the first side, the touch detecting sensor is set on the first side of the peripheral region; and wherein a direction from the second side to the first side is defined as a first direction, the area of the connect component progressively decreases along the first direction.

5. The display panel of a touch screen according to claim 4, wherein the touch control electrodes and the touch control lines are disposed on a same layer; wherein an area of the touch control electrode progressively decrease along the first direction; wherein the touch control line is directly connected with the touch control electrodes within each touch control unit; and wherein the touch control line of one touch control unit is electrically insulated from the touch control electrodes of other touch control units.

6. The display panel of a touch screen according to claim 1, wherein the touch control electrodes serve as common electrodes; wherein the touch control electrodes and the touch control lines are disposed on different layers; and wherein the touch control line is connected with the touch control electrode through a via hole.

7. The display panel of a touch screen according to claim 1, wherein the first color is red, the second color is green and the third color is blue, and
wherein the first sub-pixel and the seventh sub-pixel are red sub-pixels, the second sub-pixel and the eighth sub-pixel are green sub-pixels, and the third sub-pixel and the fifth sub-pixel are blue sub-pixels.

8. The display panel of a touch screen according to claim 1, wherein a ratio of row to column sides of the two-dimensional matrix is 1:3 or 1:2.

9. A display panel of a touch screen, comprising:
a color filter substrate and an array substrate, wherein the color filter substrate and the array substrate are arranged in a face to face position;
wherein the color filter substrate comprises a black matrix;
wherein the array substrate comprises a plurality of pixel units and a plurality of touch control units;
wherein the plurality of pixel units comprise a plurality of first pixel units and a plurality of second pixel units, both arranged in a two-dimensional matrix, wherein the first pixel units are not adjacent to each other and the second pixel units are not adjacent to each other within a same column of the two-dimensional matrix, and the first pixel units are not adjacent to each other and the second pixel units are not adjacent to each other within a same row of the two-dimensional matrix,
wherein the first pixel units each comprises a first sub-pixel for displaying a first color, a second sub-pixel for displaying a second color and a third sub-pixel for displaying a third color, wherein all the said sub-pixels are arranged in sequence in a row direction of the two-dimensional matrix, and
wherein the second pixel units each comprises a fourth sub-pixel for display the first color, a fifth sub-pixel for displaying the second color and a sixth sub-pixel for displaying a fourth color, wherein all the said sub-pixels are arranged in sequence in the row direction of the two-dimensional matrix,
wherein the fourth color is white, and the sixth sub-pixel is a white sub-pixel,
wherein the white sub-pixel comprises a first region and a second region, and wherein the second region is sheltered by the black matrix from a light emitting direction of the display panel;
wherein each of the plurality of touch control units comprises a touch control electrode, a touch control line, and a connect component through which the touch electrode is electrically connected with the touch control line, the plurality of touch control electrodes are arranged in an array, and wherein at least one of the connect components is set in the second region.

10. The display panel of a touch screen according to claim 9, wherein an area of the second region is less than or equal to 70% area of the entire white sub-pixel.

11. The display panel of a touch screen according to claim 9, further comprising a touch detecting sensor; wherein regarding each touch control unit, the touch control electrode is connected with the touch detecting sensor through the touch control line; and wherein an area of the connect component gradually reduces as the connect component gets closer to the touch detecting sensor.

12. The display panel of a touch screen according to claim 11, wherein the display panel comprises a display region and a peripheral region encircling the display region; wherein the peripheral region has a first side and a second side opposite to the first side, the touch detecting sensor is set on the first side of the peripheral region; and wherein a direction from the second side to the first side is defined as a first direction, and along the first direction, the area of the connect component progressively decreases along the first direction.

13. The display panel of a touch screen according to claim 9, wherein the touch control electrodes serve as common electrodes; wherein the touch control electrodes and the touch control lines are disposed on different layers; and wherein the touch control line is connected with the touch control electrode through a via hole.

14. The display panel of a touch screen according to claim 9, wherein the first color is red, the second color is green and the third color is blue, and
wherein the first sub-pixel and the fourth sub-pixel are red sub-pixels, the second sub-pixel and the fifth sub-pixel are green sub-pixels, and the third sub-pixel is a blue sub-pixel.

15. A display panel of a touch screen, comprising:
a color filter substrate and an array substrate, wherein the color filter substrate and the array substrate are arranged in a face to face position;
wherein the color filter substrate comprises a black matrix;
wherein the array substrate comprises a plurality of pixel units and a plurality of touch control units;
wherein the plurality of pixel units comprise a plurality of first pixel units and a plurality of second pixel units, both arranged in a two-dimensional matrix, wherein each column of the two-dimensional matrix comprises either the first pixel units or the second pixel units,
wherein the first pixel units are not adjacent to each other and the second pixel units are not adjacent to each other within a same row of the two-dimensional matrix,
wherein the first pixel units each comprises a first sub-pixel for displaying a first color, a second sub-pixel for displaying a second color and a third sub-pixel for displaying a third color, wherein all the said sub-pixels are arranged in sequence in a row direction of the two-dimensional matrix, and
wherein the second pixel units each comprises a fourth sub-pixel for display the first color, a fifth sub-pixel for displaying the second color and a sixth sub-pixel for displaying a fourth color, wherein all the said sub-pixels are arranged in sequence in the row direction of the two-dimensional matrix, wherein the fourth color is white, and the sixth sub-pixel is a white sub-pixel, wherein the white sub-pixel comprises a first region and a second region, and wherein the second region is sheltered by the black matrix from a light emitting direction of the display panel;

wherein each of the plurality of touch control units comprises a touch control electrode, a touch control line, and a connect component through which the touch electrode is electrically connected with the touch control line, the plurality of touch control electrodes are arranged in an array, and wherein at least the connect components is set in the second region.

16. The display panel of a touch screen according to claim 15, wherein an area of the second region is less than or equal to 70% area of the white sub-pixel.

17. The display panel of a touch screen according to claim 15, further comprising a touch detecting sensor; wherein the touch control electrode is connected with the touch detecting sensor through the touch control line; and wherein an area of the connect component gradually reduces as the connect component gets closer to the touch detecting sensor.

18. The display panel of a touch screen according to claim 17, wherein the display panel comprises a display region and a peripheral region encircling the display region; wherein the peripheral region has a first side and a second side opposite to the first side, the touch detecting sensor is set on the first side of the peripheral region; and wherein a direction from the second side to the first side is defined as a first direction, the area of the connect component progressively decreases along the first direction.

19. The display panel of a touch screen according to claim 15, wherein the touch control electrodes and the touch control lines are disposed on a same layer; wherein an area of the touch control electrode progressively decrease along the first direction; wherein the touch control line is directly connected with the touch control electrodes within each touch control unit; and wherein the touch control line of one touch control unit is electrically insulated from the touch control electrodes of other touch control units.

20. The display panel of a touch screen according to claim 15, wherein the touch control electrodes serve as common electrodes; wherein the touch control electrodes and the touch control lines are disposed on different layers; and wherein the touch control line is connected with the touch control electrode through a via hole.

* * * * *